United States Patent [19]

Sigemoto

[11] Patent Number: 5,180,768

[45] Date of Patent: Jan. 19, 1993

[54] COMPOSITION COMPRISING POLYMER OF 4-METHYL-PENTENE-1

[75] Inventor: Hiromi Sigemoto, Iwakuni, Japan

[73] Assignee: Mitsui Petrochemical Industries, Ltd., Tokyo, Japan

[21] Appl. No.: 657,383

[22] Filed: Feb. 19, 1991

Related U.S. Application Data

[63] Continuation of Ser. No. 512,593, Apr. 24, 1990, abandoned, which is a continuation of Ser. No. 204,120, Jun. 8, 1988, abandoned.

[30] Foreign Application Priority Data

Jun. 11, 1987 [JP]  Japan ............................. 62-146508

[51] Int. Cl.⁵ .............................................. C08K 3/30
[52] U.S. Cl. ...................................... 524/420; 524/423
[58] Field of Search ....................... 524/420, 519, 423

[56] References Cited

U.S. PATENT DOCUMENTS 3,462,389  8/1969  Schulde et al. ..................... 524/420
3,935,158  1/1976  Watanabe ............................ 524/420

FOREIGN PATENT DOCUMENTS 676232  12/1963  Canada .............................. 524/420
319586  12/1974  German Democratic Rep. .

Primary Examiner—Paul R. Michl
Assistant Examiner—Peter Szekely
Attorney, Agent, or Firm—Sherman and Shalloway

[57] ABSTRACT

A composition comprising a polymer of 4-methyl-pentene-1 and a lithopone, an amount of the lithopone being 1 to 70% by weight with respect to a total weight of the polymer and the lithopone. A molded product resulting therefrom has an improved impact strength and an excellent glossiness.

8 Claims, No Drawings

COMPOSITION COMPRISING POLYMER OF 4-METHYL-PENTENE-1

This application is a continuation of application Ser. No. 512,593, filed Apr. 24, 1990, now abandoned, which is a continuation of application Ser. No. 204,120, filed Jun. 8, 1988, now abandoned.

BACKGROUND OF THE INVENTION

1. Field of the Invention

The present invention relates to a composition comprising a polymer of 4-methyl-pentene-1, and more particularly, to such a composition by which a molded product having an improved impact strength and an excellent glossiness can be obtained.

2. Description of the Related Art

A polymer of 4-methyl-pentene-1 is applied to vessels, table ware and the like, and there is a strong demand for an improvement of the impact strength, glossiness, detergent resistance, heat resistance, and moldability, particularly the impact strength and glossiness, thereof.

To improve rigidity of the polymer of 4-methyl-pentene-1, a filler such as talc or barium sulfate has been blended therein, but when a filler such as talc or barium sulfate is blended, the impact strength of the resulting polymer is little improved. Further, an incorporation of a filler such as talc into the polymer of 4-methyl-pentene-1 generally causes a reduction of the glossiness, and therefore, there is a need for a filler which can be formulated in the polymer of 4-methyl-pentene-1 without reducing the glossiness of the resulting product.

SUMMARY OF THE INVENTION

After conducting various research projects to develop a composition comprising a polymer of 4-methyl-pentene-1 from which a molded product having not only an excellent impact strength but also an excellent glossiness, detergent resistance, heat resistance, and moldability can be formed, the inventors of the present invention found that the problem can be resolved by formulating a lithopone as a filler in the polymer of 4-methyl-pentene-1, and thus completed the present invention.

Accordingly, the object of the present invention is to provide a composition of a polymer of 4-methyl-pentene-1 from which a molded product having not only an excellent impact strength but also an excellent glossiness, detergent resistance, heat resistance, and moldability can be formed.

Other objects and advantages of the present invention will be apparent from the following description.

In accordance with the present invention, there is provided a composition comprising a polymer of 4-methyl-pentene-1 and a lithopone, an amount of the lithopone being 1 to 70% by weight with respect to a total weight of the polymer and the lithopone.

Further, the present invention provides a molded product formed from the above composition.

DESCRIPTION OF THE PREFERRED EMBODIMENTS

The composition according to the present invention comprises a polymer of 4-methyl-pentene-1 and lithopone as a filler. The amount of lithopone ranges from 1 to 70% by weight, preferably 5 to 50% by weight, based on the total weight of the polymer of 4-methyl-pentene-1 and the lithopone.

The polymer of 4-methyl-pentene-1 which may be used in the present invention, is a homopolymer of 4-methyl-pentene-1 or a copolymer comprising units derived from 85 mole% or more of 4-methyl-pentene-1 and those derived from 15 mole% or less of another o-olefin having 2 to 20 carbon atoms such as ethylene, propylene, butene-1, hexene-1, octene-1, decene-1, tetradecene-1, octadecene-1, or the like. The melt flow rate [load 5 kg; 260° C.] of the polymer of 4-methyl-pentene-1 preferably ranges from 0.5 to 200 g/10 min. A polymer having a melt flow rate of less than 0.5 g/10 min has a high melt viscosity, and thus a poor moldability, whereas a polymer having a melt flow rate of more than 200 g/10 min has a low melt viscosity, and thus a poor moldability and a low mechanical strength.

The lithopone which may be used in the present invention is preferably a naturally occurring white pigment which is a mixture comprising mainly zinc sulfide and barium sulfate. The ratio of zinc sulfide and barium sulfate is 2:8 to 5:5, generally about 3:7. The naturally occurring lithopone further contains trace amounts of metals in addition to the above zinc sulfide and barium sulfate. Such a naturally occurring lithopone is available from the Federal Republic of Germany or the People's Republic of China.

Hitherto, lithopone has been employed as a pigment for a paint or a rubber compounding ingredient for coloring, but it has not been known that formulating the lithopone in a polymer of 4-methyl-pentene-1 can produce a molding composition providing not only an excellent impact strength but also an excellent glossiness, detergent resistance, heat resistance, and moldability.

The above finding by the present inventors is remarkable and unexpected. As mentioned above, the lithopone used as the filler in the present invention mainly comprises zinc sulfide and barium sulfate, but no improvement in the impact strength, and little improvement in glossiness, detergent resistance, heat resistance, and moldability can be achieved if only either the zinc sulfide or the barium sulfate, or a combination of zinc sulfide and barium sulfate alone is blended with a polymer of 4-methyl-pentene-1.

Further, if the lithopone is formulated in a polyolefin (e.g., polypropylene) other than the polymer of 4-methyl-pentene-1, an improvement in the impact strength, glossiness, detergent resistance, heat resistance, and moldability cannot be obtained. The lithopone selectively improves the impact strength, glossiness, detergent resistance, heat resistance and moldability, when mixed with the polymer of 4-methyl-pentene-1.

In addition to the polymer of 4-methyl-pentene-1 and the lithopone, the composition according to the present invention may further contain additives such as a heat stabilizer, weathering agent, halogen trapping agent, lubricating agent, nucleating agent, antistatic agent, inorganic or organic pigment, dyestuff, or flame retarder, if necessary.

The polymer of 4-methyl-pentene-1, the lithopone as the filler, and the optional other additives may be blended by a conventional known method; for example, each ingredient may be melt-kneaded by a Henschel mixer.

The present composition comprising the polymer of 4-methyl-pentene-1 and a certain amount of the lithopone as the filler can improve not only the impact strength, but also the glossiness, detergent resistance, heat resistance and moldability, and thus may be used for the production of table ware, trays, filter cases, or the like.

EXAMPLES

The present invention now will be further illustrated by, but is by no means limited to, the following Examples.

EXAMPLE 1

First 70% by weight of poly(4-methyl-pentene-1) [trade name: TPX® RT 18, manufactured by Mitsui Petrochemical Industries Ltd.] referred to as "PMP" hereinafter], and 30% by weight of lithopone [manufactured by Metal Geselschaft, Federal Republic of Germany], 0.25 part by weight (based on 100 parts by total weight of PMP and lithopone) of tetrakis [methylene-3(3,5-di-tert-butyl-4-hydroxy-phenyl)propionate] methane [trade name: Irganox 1010, manufactured by Musashino-Geigy] [referred to as "TPM" hereinafter], and 0.25 part by weight [based on 100 parts by total weight of PMP and lithopone] of glycerol monostearate [trade name: Atomos #150, manufactured by Kao Corp.] [referred to as "SMG" hereinafter] were mixed in a Henschel mixer, and the whole was then kneaded through an extruder ($\phi$45 mm) to obtain a molding composition. Specimens were molded by an injection molding machine [M-100 Type, manufactured by Meiki Manufacturing] at a molding temperature of 300° C. and a die temperature of 60° C., and the specimens were evaluated as follows:

Tensile test: performed in accordance with ASTM D638, except that a specimen according to ASTM TYPE IV was used.

Izod impact strength (kg.cm/cm): according to ASTM D256.

Glossiness (%): ASTM D523, angle of incidence =60°.

Boiling test: Appearance was observed after dipping the specimen in boiling water for a predetermined period of time.

Table ware washing machine test:

Appearance of the specimen was observed after a predetermined number of cycles comprising prewashing with a water at 65° C. for 7 minutes, washing with a detergent, and rinsing for 78 minutes and then drying for 20 minutes, in a table ware automatic washing machine.

The results are shown in Table 1.

EXAMPLE 2

The procedure as mentioned in Example 1 was repeated, except that 90% by weight of PMP and 10% by weight of lithopone were used.

The results are shown in Table 1.

EXAMPLE 3

The procedure as mentioned in Example 1 was repeated, except that lithopone from the People's Republic of China was used instead of that from West Germany.

The results are shown in Table 1.

COMPARATIVE EXAMPLE 1

The procedure as mentioned in Example 1 was repeated, except that 30% by weight of a mixture of 21 parts by weight of barium sulfate [trade name: EB-2, manufactured by Sakai Kagaku] [referred to as "BS" hereinafter] and 9 parts by weight of zinc sulfide [Shimakyu Yakuhin] was used instead of the lithopone.

The results are shown in Table 2.

COMPARATIVE EXAMPLE 2

The procedure as mentioned in Example 1 was repeated, except that BS was used instead of lithopone. The results are shown in Table 2.

COMPARATIVE EXAMPLE 3

The procedure as mentioned in Example 1 was repeated, except that the amount of PMP used was 100% by weight, and lithopone was not used.

The results are shown in Table 2.

COMPARATIVE EXAMPLE 4

The procedure as mentioned in Example 1 was repeated, except that 100% by weight of polypropylene resin [trade name: Hypole®, manufactured by Mitsui Petrochemical Industries Ltd.] [referred to as "PP" hereinafter] was used instead of PMP and lithopone.

The results are shown in Table 2.

COMPARATIVE EXAMPLE 5

The procedure as mentioned in Example 1 was repeated, except that PP was used instead of PMP.

The results are shown in Table 2.

TABLE 1

| Items | Example 1 | Example 2 | Example 3 |
|---|---|---|---|
| Composition (wt %) | PMP/lithopone WG$^{(1)}$ = 70/30 | PMP/lithopone WG$^{(1)}$ = 90/10 | PMP/lithopone C$^{(2)}$ = 70/30 |
| Yield stress (kg/cm$^2$) | 240 | 250 | 240 |
| Elongation at break (%) | 25 | 25 | 25 |
| Izod impact strength (kg · cm/cm) | | | |
| Notched | 6 | 5 | 6 |
| Unnotched | 50 | 46 | 53 |
| Glossiness (%) | 74 | 76 | 72 |
| Boiling test$^{(3)}$ | | | |
| Initial | o | o | o |
| 1 day | o | o | o |
| 3 days | o | o | o |
| 6 days | o | o | o |
| 9 days | o | o | o |
| 12 days | o | o | o |
| Table ware washing machine test$^{(4)}$ | | | |
| Initial | o | o | o |
| 3 times | o | o | o |
| 6 times | o | o | o |
| 10 times | o | o | o |
| 15 times | o | o | o |
| 20 times | o | o | o |

$^{(1)}$lithopone from West Germany
$^{(2)}$lithopone from People's Republic of China
$^{(3)}$Boiling test
o: No change in appearance
Δ: Some pockmarks were formed.
x: Many pockmarks were formed.
$^{(4)}$Table ware washing machine test
o: No change in appearance
o-Δ: Small pockmarks were formed.
Δ: Many pockmarks were formed
x: Yellowed

TABLE 2

| Items | Comparative Example | | | | |
|---|---|---|---|---|---|
| | 1 | 2 | 3 | 4 | 5 |
| Composition (wt %) | PMP/BS/ZnS = 70/21/9 | PMP/BS = 70/30 | PMP = 100 | PP = 100 | PP/lithopone WG[1] = 70/30 |
| Yield stress (kg/cm$^2$) | 240 | 240 | 235 | 230 | 240 |
| Elongation at break (%) | 25 | 9 | 25 | 20 | 20 |
| Izod impact strength (kg · cm/cm) | | | | | |
| Notched | 6 | 5 | 5 | 7 | 6 |
| Unnotched | 14 | 15 | 15 | 20 | 20 |
| Glossiness (%) | 70 | 70 | 80 | 45 | 55 |
| Boiling test[3] | | | | | |
| Initial | ○ | ○ | — | — | — |
| 1 day | Δ | Δ | — | — | — |
| 3 days | Δ | Δ | — | — | — |
| 6 days | Δ | Δ | — | — | — |
| 9 days | Δ | Δ | — | — | — |
| 12 days | x | x | — | — | — |
| Table ware washing machine test[4] | | | | | |
| Initial | ○ | — | — | — | — |
| 3 times | ○ | ○ | — | — | — |
| 6 times | ○ | ○ | — | — | — |
| 10 times | ○ | Δ | — | — | — |
| 15 times | ○ | Δ | — | — | — |
| 20 times | ○-Δ | x | — | — | — |

[1]lithopone from West Germany
[2]lithopone from People's Republic of China
[3]Boiling test
○: No change in appearance
Δ: Some pockmarks were formed.
x: Many pockmarks were formed.
[4]Table ware washing machine test
○: No change in appearance
○-Δ: Small pockmarks were formed.
Δ: Many pockmarks were formed
x: Yellowed Although the present invention has been described with reference to specific embodiments, various changes and modifications obvious to those skilled in the art are deemed to be within the spirit, scope and concept of the invention.

I claim:

1. A composition comprising a polymer of 4-methyl-pentene-1 and a lithopone, the amount of said lithopone being 1 to 70% by weight with respect to the total weight of said polymer and said lithopone.

2. A composition according to claim 1, wherein said polymer of 4-methyl-pentene-1 is a homopolymer of 4-methyl-pentene-1 or a copolymer comprising units derived from 85 mole % or more of 4-methyl-pentene-1 and units derived from 15 mole % or less of another α-olefin having 2 to 20 carbon atoms, based upon the total moles of said units.

3. A composition according to claim 1, wherein said lithopone is a naturally occurring lithopone.

4. A composition according to claim 1, further comprising a heat stabilizer, a weathering agent, a halogen trapping agent, a lubricating agent, a nucleating agent, an antistatic agent, an inorganic or organic pigment, a dyestuff, or a flame retardant.

5. A molded product resulting from a composition according to claim 1.

6. A method of producing a 4-methyl-pentene-1 polymer composition having an improved impact strength, which comprises adding a lithopone to the 4-methyl-pentene-1 polymer in an amount of from 1 to 70% by weight of said polymer and said lithopone.

7. A method according to claim 6, wherein said polymer of 4-methyl-pentene-1 is a homopolymer of 4-methyl-pentene-1 or a copolymer comprising units derived from 85 mole % or more of 4-methyl-pentene-1 and units derived from 15 mole % or less of another α-olefin having 2 to 20 carbon atoms, based upon the total moles of said units.

8. A method according to claim 6, wherein said lithopone is a naturally occurring lithopone.

* * * * *